United States Patent [19]

Russo

[11] 4,022,718

[45] May 10, 1977

[54] HIGH RESILIENCE FIRE RETARDANT URETHANE FOAM

[75] Inventor: Robert Victor Russo, Brooklyn, N.Y.

[73] Assignee: GAF Corporation, New York, N.Y.

[22] Filed: Mar. 6, 1974

[21] Appl. No.: 448,517

[52] U.S. Cl. .................... 260/2.5 AM; 260/2.5 AJ
[51] Int. Cl.$^2$ ................. C08G 18/32; C08G 18/14
[58] Field of Search ................ 260/2.5 AJ, 2.5 AM

[56] References Cited

UNITED STATES PATENTS

| | | | |
|---|---|---|---|
| 3,723,392 | 3/1973 | König | 260/75 NP |
| 3,764,546 | 10/1973 | Feltzin | 260/2.5 AM |
| 3,779,953 | 12/1973 | Papa | 260/2.5 AJ |
| 3,803,064 | 4/1974 | Fishbein | 260/2.5 AM |
| 3,812,047 | 5/1974 | D'Alelio | 260/2.5 AM |
| 3,933,690 | 1/1976 | D'Alelio | 260/2.5 AM |

FOREIGN PATENTS OR APPLICATIONS

| | | |
|---|---|---|
| 45-36428 | 11/1970 | Japan |
| 45-999 | 1/1970 | Japan |
| 1,305,036 | 1/1973 | United Kingdom |

OTHER PUBLICATIONS

Patten, "Highly Resilient, Cold Molded Urethane Flexible Foam," Journal of Cellular Plastics, May/June 1972, pp. 134–143.
Rough Draft Partial Translation of Japanese Patent No. 45-999; Prepared by the U.S. Patent Office.
Rough Draft Partial Translation of Japanese Patent No. 45-36428; Prepared by the U.S. Patent Office.
Chemical Abstracts, vol. 75:141752g, 1971.
Chemical Abstracts, vol. 73:4829g, 1970.
"Dibromobutenediol, a New Flame Retardant Monomer for Polyurethane, Polyester, and Epoxy Systems," G.A.F. Bulletin 9649-001, 4 pages.
"A New Route to Flame Retardant Thermoplastic Polyurethane;" G.A.F. Bulletin 9649-006, 8 pages.

Primary Examiner—C. Warren Ivy
Attorney, Agent, or Firm—Walter C. Kehm; Joshua J. Ward

[57] ABSTRACT

High resilience cold cured polyether urethane foam incorporating 2,3-dibromo-2-butenediol-1,4, as a chain extender and fire retardant component.

24 Claims, No Drawings

HIGH RESILIENCE FIRE RETARDANT URETHANE FOAM

BACKGROUND OF THE INVENTION

High resilience cold cured slabstock or molded polyether urethane foams have been prepared heretofore in which the conventional "hot cure" cycle required previously to effect completion of the urethane reaction in foam formulation has been eliminated and lower molding costs and faster cycles secured. The additional advantages of significantly high resilience and load ratio, high tensile strength, higher elongation and greater tear strength together with significant improvements in hystersis and fatigue have caused a demand for these foams particularly in furniture, bedding applications, and in automotive deep molded seat cushioning. These applications of high resilience foams render the flammability and smoke emission properties of these foams of particular relevance and indeed the subject of governmental concern and regulation. While high resilience foams are known to have certain fire retardant properties, a further substantial enhancement of the self-extinguishing and non-burning characteristics of these foams without an adverse effect on the other and improved properties referred to in the foregoing discussion would fulfil a felt need, particularly where achieved with concomitant improvements in the process of manufacture of the foam.

In this latter context, it has been known heretofore to use 4,4'-methylene-bis(2-chloraniline) as a chain extender in the preparation of these high resilience foams; a practice which has been discouraged by further governmental regulations resulting from properties of this compound considered harmful to personnel in the concentrations ordinarily required in foam preparation. Efforts to replace this compound, in whole or in part with other materials, for example, saturated glycols such as 1,4-butanediol, have only been partially successful and neither the glycols, nor the aniline that it is proposed to displace, impart a significantly enhanced self-extinguishing and non-burning property to the foam.

Accordingly, if the flammability of high resilience cold cured flexible polyether urethane foams could be measurably improved, the qualities normally inhering in high quality, high resilience foams retained, and 4,4'-methylene bis(2-chloroaniline) replaced in the formulation of these foams, in an inexpensive manner, a significant advance in the state of the art would be achieved.

SUMMARY OF THE INVENTION

It is therefore, a principal object of this invention to provide novel high resilience flexible polyether urethane foams in which the desirable properties of these foams are retained or enhanced.

It is a further object of this invention to eliminate the use of toxic components from the preparation of these foams while enhancing their fire retardant properties.

Another object is to achieve the foregoing advantages and others in an economically expedient "one-shot" process.

Other and additional objects and advantages of the present invention will become more apparent from the following description.

Accordingly, it has now been discovered that high resilience cold cured polyether urethane foams of significantly enhanced fire retardant properties may be prepared by a "one-shot" process that incorporates 2,3-dibromo-2-butenediol-1,4 as a chain extender and reactive fire retardant component within the foam replacing toxic curing agents such as 4,4'-methylene bis(2-chloroaniline) without otherwise adversely affecting the desirable properties of the foam product.

DESCRIPTION OF THE PREFERRED EMBODIMENT

The high resilience foams prepared according to the invention are flexible polyether urethanes possessing inter alia a comfort or sag factor as measured by ASTM D-1564–69 of at least 2.5 and preferably 2.8 to 3.1. This factor is the ratio of the indent load deflection ("ILD") at 65 percent deflection to the ILD at 25 percent deflection. Indent load deflection is a measure of the firmness of load bearing properties of a flexible foam.

Sag or ILD factor and compression set are controlled by the composition of the foam and to a lesser extent the conditions under which the foam's components are reacted.

Hysteresis, the measure of the energy lost or absorbed by a foam when subjected to deformation, and load bearing characteristics are also significant and materially different from those of conventional foams. Low hysteretic values (the ratio of the load at 65 percent return to the load at 25 deflection or indentation) are normally found in the case of high resilience foams prepared as described herein, as are height, and hardness resistance or fatigue, which are generally less than one percent and twenty percent respectively.

These highly resilient polyether urethane foams are, more particularly, those reaction products prepared in a one-shot process by a mixture of polyols having a molecular weight of at least about 4000 preferably within the range of 4000 to 7000; one or more aromatic polyisocyanates particularly tolylene diisocyanate and methylene diphenyl, isocyanate in amounts sufficient to result in trace amounts of the trimers thereof in said reaction product with or without an auxiliary blowing agent; a silicone surfactant, amine catalysts appropriate to a one-shot polymerization of the reactants; and 2,3-dibromobutenediol-1,4.

The term "polyether urethane" as employed herein is intended to include generally those polyether urethanes incorporating repeating urea, as well as urethane, units.

As indicated, 2,3-dibromobutene-2-diol-1,4 is utilized in preference to, for example, its corresponding saturated compound as a result of the discovery of its combination of fire retardant characteristics, resistance to dehydrobromination, and scorching, reduced smoke emission, and reduced susceptibility to humid aging deterioration in combination with its ability to replace 4,4'-methylene bis(2-chloroaniline) without adversely affecting the properties of high resilience foams in which it is reactively incorporated although the number of urea linkages present in the foam product will be substantially reduced by virtue of this substitution.

The 2,3-dibromo-2-butenediol-1,4 is present in the reaction system in an amount so as to provide a bromine content in the final polyurethane of from about 1.5 percent to about 6 percent by weight of the foam product. This is accomplished usually by incorporating about 3 to 9 parts of this brominated diol per 100 parts by weight of unhalogenated polyol present. This component will also provide active hydrogen groups. In this regard, it has been found, in accordance with the present invention, that as little as about 1.5 percent by weight bromine provides non-burning and fire retardant characteristics to the polyurethane and an unexpected and significantly increased resistance to scorching by virtue of the diol's greater stability to dehydrobromination. In addition, it has been discovered that if the amount of bromine is increased to an amount substantially in excess of about 6 percent by weight, no appreciable increase in the non-burning and fire retardant characteristics of the polymer are observed and higher bromine contents often cause some decrease in the physical and mechanical characterization of the basic polymer, i.e., discoloration, poor moldability, etc. Preferably, the bromine content of the polyurethane should be from about 1.5 to about 6 percent by weight.

The 2,3-dibromo-2-butenediol-1,4, is normally present substantially as trans-2,3-dibromo-2-butenediol-1,4, but it is intended to encompass 2,3-dibromo-2-butenediol-1,4 regardless of its steric configuration and whether present in a single isomeric form or mixtures thereof.

The high molecular weight polyols employed to supply the soft segment portion of the polyurethanes of the invention, that is the component containing active hydrogen moieties for reaction with the NCO groups of the hard segment necessary to production of a polyurethane and discussed hereinafter, are those as indicated, having a molecular weight of about 4000 to 7000 and characterized by a hydroxyl number of about 20 to 60. As is well known in the art, the hydroxyl number is defined as the number of milligrams of potassium hydroxide required for the complete neutralization of the hydrolysis product of the fully acetylated derivative prepared from 1 gram of polyol. The hydroxyl number can also be defined by the equation.

$$OH = (56.1 \times 1000 \times f)/m.w.$$

where
OH = hydroxyl number of the polyol
f = average functionality, that is, average number of hydroxyl groups per molecule of polyol
m.w. = average molecular weight of the polyol.

The polyether polyols can be a mixture of two or more polyols as well as one polyol. The polyethers employed as the active hydrogen-containing reactant are therefore those derived from the condensation of one or more mols of an alkyleneoxide with a high molecular weight polyhydric alcohol, or mixtures thereof, wherein the alcohol or alcohols present in their entirety or in a major proportion by weight are triols. The conventional alkylene oxides used are, for example, ethylene oxide, propylene oxide, butylene oxide, styrene oxide, amylene oxide and the like and mixtures thereof.

Polyethers for use in the one-shot techniques employed herein are thus, by way of illustration, the unhalogenated commercially available high molecular weight poly (oxypropylene) derivatives of polyhydric alcohols, for example, poly (oxypropylene) ethers of glycerol, trimethylolpropane, 1,2,6-hexanetriol and sorbitol. Particularly preferred polyols for use in the preparation of high resilience foams, and especially slabstock, are the primary end-capped (ethylene oxide) triols having a molecular weight of about 4000 to 7000 and particularly about 4500.

Other polyols employed in preparing the polyethers of the invention are 1,4-butanediol, 1,3-butanediol, dodec-9,10-ene-1, 2-diol, thioglycol, 1,6-hexane-diol, thiodiglycol, 2,2-dimethyl propane-1,3-diol, 1,18 octadecane diol, 2-ethyl hexane-1,3-diol, 2,4-dimethyl-2-propyl heptane-1,3-diol, 2-butene-1,4-diol, 2-butyne-1,4-diol, diethylene glycol, triehylene glycol, dipropylene glycol, pentaerythritol, hexahydropyrocatechol, 4,4'-dihydroxydicyclohexyl dimethylmethane and the like and mixtures thereof.

The alkylene oxide normally contains from 2 to 5 carbon atoms, in any event, and is condensed, advantageously, with from about 5 to about 30 mols per functional group of the polyol initiator. Illustrative processes for preparation of polyhydric polyalkylene ethers for use herein include those described in U.S. Pat. No. 3,009,939, U.S. Pat. No. 3,061,625 or that disclosed in the *Encyclopedia of Chemical Technology*, Volume 7, pages 257, 262, Interscience Publishers (1951).

Other preferred high molecular weight polyols are so-called polymer/polyols including styrene-acrylonitrilepolypropylene oxide copolymers sold by Union Carbide Corporation, 270 Park Avenue, New York, New York under the trade name designations NIAX Polyol 32–33 and NIAX Polyol 31–28.

The hard segment source of NCO groups for reaction with the active hydrogen reactants present in the reaction mixture is an aromatic diisocyanate, in part because of their tendency to form dimers and trimers, and specifically tolylene diisocyanate or polymethylene polyphenyl polyisocyanate of the general formula:

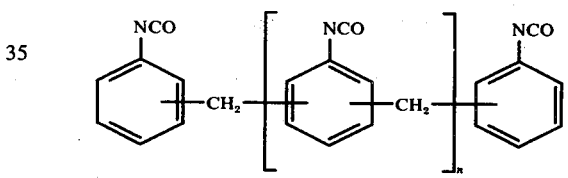

wherein n is predominantly an integer generally of 1 or 0 or a mixture wherein n is primarily 1 in a preferred embodiment and to a lesser extent 0, and thus the trimer, dimer or mixtures thereof, and where this isocyanate is used in an undistilled state, may include residual or trace quantities of high polymers as well. The preferred composition is one containing an excess of 50 percent by weight of trimer, in excess of 40 percent by weight of dimer and less than 5 percent of higher polymers, e.g. n is an integer of from about 4 to 8. The foregoing polymethylene polyphenyl polyisocyanates are referred to for convenience hereinafter as "PPI". The tolylene diisocyanate used generally is an undistilled blend as well as a distilled mixture with a ratio by weight in either event of eighty parts of 2,4-tolylene diisocyanate and about twenty parts by weight of 2,6-tolylene diisocyanate (referred to hereinafter as "TDI").

The ratio by weight of PPI to TDI where both are present, is within the range of 1 to 2 and preferably about 1.5 to 2 parts of the former to one part of the latter. The ratio of PPI to TDI is critical within the foregoing range since a higher percentage of the generally more reactive PPI will tend to induce excessive cross-linkage principally as allophanate and biuret linkages in the product foam and consequently decrease its desired resilience. The ratios recited tend to achieve maximum resiliency of the foam product consistent with foam stability.

It is preferred in accordance with the present invention that the polyurethane products have a molecular weight of at least 15000 in order to provide foam products of sufficiently high strength. To achieve this molecular weight it is important that the condensation reaction be carried out with a carefully determined ratio of NCO groups to —OH or other active hydrogen groups in the reaction mixtures of the one-shot process so that there is preferably an excess of —NCO groups to reactive hydrogen (referred to hereinafter for convenience as the NCO/OH ratio). A preferred NCO/OH ratio is by weight from in excess of 1 to 1.15 parts of NCO groups to 1 part of reactive hydrogen (expressed as OH component). An NCO/OH ratio of 0.95 to 1.15:1 is however practicable. The ratio is one, in any event, which should result in trace amounts of polymerized isocyanate, less than five percent (5%) by weight of the isocyanate charged to the reaction, predominantly as trimerized TDI and partially polymerized PPI, in the product foam.

The production of the cellular products of the invention involves further the employment of a suitable foaming or blowing agent. Carbon dioxide from water added to the reaction system is the most desirable agent for the purpose of securing cellular formation and expansion. The water will also serve as an added source of active hydrogen in the reaction system. Conventional halocarbons, such as the haloalkanes, e.g. monofluorotrichloromethane and trichlorofluoromethane, may also be so utilized to lower density but are normally omitted in that their presence invites a proportional diminution in load bearing capacity.

Conventional silicone surfactants are desirably, but not necessarily, incorporated in the reaction system of the invention in order to stabilize, in conjunction with the catalysts present, the cellular foam product. The surfactant may be added with any of the two to six streams usually fed to the mixing head in the one-shot process.

The amount of silicone surfactant utilized is on a weight basis of normally about 0.8 to 1.5 part, and preferably about 1.0 part, silicone to each 100 parts of polyol present with, additionally, about 0.1 to 0.5, and preferably about 0.2 part, silicone for each 0.5 part water above the usual concentration of 3.5 parts of water by weight of the total reaction system. The concentration of water will normally not exceed 4 parts by weight of the total system however and preferably will be retained within the range of 2.5 to 3.5 parts to each 100 parts of polyol.

The catalysts employed in preparing these high resilience foams are well known and are usually tertiary amines or combinations thereof. These amines, while water-isocyanate catalysts (and thus primarily responsible for foam production), also have a substantial and efficacious effect on polymer formation, which however varies with the particular amine employed. Most effective in polymer formation of these amines is 1,4-diazabicyclo [2.2.2] octane. Additional amine catalysts which may be used alone or preferably in combination with each other and most desirably with the foregoing diazabicyclooctane are illustratively, dimethyl ethanolamine, N-ethylmorpholine, cyclohexylamine, and dimethylaminoethyl ether (the latter in solution in dypropylene glycol).

The use of conventional metallorganic catalysts such as stannous octoate, which tend to promote the reaction between the polyol hydroxyl moieties and the diisocyanates, is not therefore essential to the formation of the high resilience foams by a one-shot process although they may be used if desired in combination with one or more of the foregoing amines. More favorable hysteresis retention values are believed to be obtained in the product foams, however, by avoidance of the organotin catalysts.

Methods of producing one-shot high resilience polyether urethane foams commercially are well known and include numerous processing variables including the machines used, mixer speeds, steam temperatures, conveyor speeds and angles, well known to those skilled in the art. The process will, for example, go forward in production of slab stock desirably at ambient or slightly elevated temperature in the mixing head, for example 70° to 120° F. The cream time, that is the period of time required for the generated carbon dioxide to saturate the reaction mixture is normally in the range of 10 to 20 seconds.

In a standard one shot operation each component of the formulation is admitted to the mixing head through individual feed lines at a predetermined ambient temperature. The silicone component can, however, be added to any of the streams, usually two to six in number, leading to the mixing head. Often, too, the number of feed lines entering the head is reduced by introduction of the catalyst or other components used only in small amounts, into the polyol line upstream from the mixing head. An inline blender is used to premix the components of the reaction system before they reach the mixing head. Regular calibration of the component streams is of considerable assistance in determining metering efficiency. Orifice opening control, back pressure in the mixing head, pouring procedures, and related steps are also adjusted within well known, flexible and discretionary parameters.

Illustrative processing conditions and apparatus for use in manufacturing molding and slabstock high resilience foams is described illustratively in Patten et al, *High Resiliency Foams Made with Polymer Polyols, Journal of Cellular Plastics*, pages 92 to 98, March/April 1973, and particularly Table 1 thereof.

Various processing limits for production of high resilience molded foams are disclosed, also by way of illustration, in Wolfe, Jr. H. W., Designing High Resilience Molded Foams, *Journal of Cellular Plastics*, pages 134–138, May/June, 1973.

The replacement of 4,4'-methylene bis(2-chloroaniline) as a chain extender by 2,3-dibromo-2-butenediol-1,4 has a significant advantage in that it does not require alteration of the standard processing steps. The brominated butenediol may also be incorporated conveniently into the polyol line upstream from the entry of the latter into the mixing head. The chain extension of the polyether urethane polymer secured by the brominated butenediol is at least equivalent to that of 4,4'-methylene bis(2-chloroaniline). In addition, there is imparted a stability to dehydrobromination and scorching sufficient to qualify the high resilience foam of which the brominated butenediol is at least equivalent to that of 4,4'-methylene bis(2-chloroaniline), supplementing the self-extinguishing characteristics measured for example by ASTM D-1692 and non-burning properties measured by Motor Vehicle Safety Standard 302.

The quantity of NH groupings derived from the isocyanate present in the polyether urethanes of the invention, is not narrowly critical. These groupings may be present illustratively in amounts by weight of 2.5 percent to 6.0 percent and provide excellent tensile strength and associated physical properties but lesser and greater percentages may also be present without any materially adverse effect resulting.

The following examples are further illustrative of the invention. In these examples all parts and percentages are by weight unless otherwise expressly indicated.

EXAMPLE 1

This example illustrates the preparation of a high resilience polyether urethane foam according to the practice of the invention and contrasts its properties with a high resilience polyether urethane prepared in the same manner and differing only in the use of a conventional chain extending component.

The following catalysts and reaction components in the amounts recited were employed in the one-shot process of this example.

Table I

| Component | Weight (phr)* |
|---|---|
| Polyol (Union Carbide Polyol LC-34**) | 95 |
| 2,3-Dibromo-2-butenediol-1,4*** | 5 |
| Silicone (Union Carbide Silicone L-5303) | 1.5 |
| Reaction product of cyclohexyl amine and an alkylene oxide, e.g. propylene oxide (Abbott Laboratories Polycat 12) | 0.4 |
| 1,4-Diazabicyclo[2.2.2.]octane (33% solution in dipropylene glycol) (Air Products Corp., Chemical Additives Division) | 0.2 |
| bis(2-Dimethylamino ethyl)ether (70% solution in dipropylene glycol) | 0.2 |
| water | 3.0 |
| tolylene diisocyanate (2,4-isomer, 80%; 2.6-isomer, 20%) | 17.12 |
| polymethylene polyphenyl polisocyanate (Upjohn PAPI 901)**** | 31.84 |

*parts per one hundred parts by weight of polyol
**molecular weight: 4781.4
***molecular weight: 246
****equivalent weight: 130

Polyol, 2,3-dibromo-2-butenediol 1,4, silicone surfactant and catalysts in the amounts recited in Table I were added to a 16 ounce polystyrene cup, heated to 60° C. with stirring to dissolve the brominated butenediol and cooled to 40° C., giving a clear solution. The cup containing the polyol solution was mounted upon a laboratory jack and raised into position under a Brookfield counterrotating mixer. The solution was stirred at 500 revolutions per minute for a period of 30 seconds while the water was added with a syringe. The isocyanate mixture was added with a syringe immediately thereafter. The mixture creamed 0.67 minutes thereafter manifesting a cream time of 4 seconds and was poured into a polytetrafluroethylene-lined mold. After 1.67 minutes the foam rise was completed. The foam was cured at ambient temperature for a period of 15 minutes, removed from the mold and crushed. The resulting foam had a brown cast resulting, it is believed, from the PPI; was uniform with fine porosity; and contained about 2 weight percent of bromine.

A high resilience foam was prepared in like manner using 4,4-methylene bis (2-chloroaniline) as the chain extender (referred to in the following Table II as "MOCA") in place of 2,3-dibromo-2-butenediol-1,4 (referred to in Table II as "$Br_2B_2D$") utilized in the practice of the invention.

The foregoing $Br_2B_2D$ and MOCA-containing foams manifested the following properties when measured by the indicated ASTM test methods:

Table II

| Property | ASTM | $Br_2B_2D$ | MOCA |
|---|---|---|---|
| Density, pct (1) | D-1564 | 2.74 | 2.80 |
| Resiliency, % | D-1564 | 42.7 | 42.2 |
| Tensile, psi | D-1564 | 16.9 | 18.4 |
| Elongation, % | D-1564 | 103 | 92.8 |
| ILD (2) 25% | D-1564 | 17.8 | 21.4 |
| 65% | D-1564 | 49.4 | 64.8 |
| Sag factor (3) | D-1564 | 2.78 | 3.03 |
| Oxygen Index | D-2863 | 21.0 | 21.5 |
| Flammability | D-1692 | 1.9 in./min. | 2.6 in./min. |

(1) Pounds per cubic foot
(2) Indentation load deflection
(3) 65%/25% ILD ratio, or "comfort index"

The foregoing properties qualify both of the foregoing foams for usage as deep foam molded seat cushioning in the United States automotive industry. The substitution of the 2,3-dibromo-2-butenediol-1,4 for 4,4'-methylene bis(2-chloroaniline) avoids, however, the toxic effects of the latter compound which are manifested in the foam manufacturing process. As will be evident from the foregoing Table II the brominated butenediol ($Br_2B_2D$) introduces a significantly enhanced fire retardancy to the foam without the use of special additives.

EXAMPLE 2

This example illustrates the preparation of a high resilience polyether urethane foam according to the practice of the invention and contrasts its properties with those of foams prepared in like manner but differing only in the use of other known chain extenders.

The following catalysts and reaction components in the amounts recited were employed in the one shot foam preparation of this example.

Table III

| Component | Weight (phr)* | | |
|---|---|---|---|
| | Run 1 | Run 2 | Run 3 |
| Polyol (Dow Voranol CP 4701)** | 95 | 95 | 98.2 |
| 4,4'-methylene bis(2-chloroaniline) | 5 | | |
| 2,3-dibromo-2-butenediol-1,4 | | 5 | |
| 2,3-dibromobutanediol | | | 1.8 |
| Water | 2.75 | 2.75 | 2.75 |
| Dimethylethanolamine | 0.8 | 0.8 | 0.8 |
| Triethylene diamine (33% solution in dipropylene glycol) | 0.2 | 0.2 | 0.2 |
| Tolylene diisocyanate (undistilled) | 51.6 | 52.0 | 52.1 |
| Properties of the Foam | Test Procedures | | |
| Density, pounds per square feet | ASTM D 1622 | 2.66 | 2.83 | 2.61 |
| Resiliency, percentage | ASTM D-1564-69 | 40.3 | 38.0 | 43.4 |
| ILD, 25% pounds per square inch | ASTM D-1564-69 | 0.57 | 0.87 | 0.66 |
| ILD, 65% pounds per square inch | ASTM D-1564-69 | 1.60 | 2.12 | 1.77 |
| Tensile strength, pounds per square inch | ASTM D 1564 | 10.8 | 19.5 | 19.4 |
| Elongation, % | ASTM D 1564 | 68 | 104 | 108 |
| Flammability, oxygen, index | ASTM D 2863 | 20.6 | 22.3 | 19.8 |

*parts per one hundred parts of the polyol present
**molecular weight: 4700: a triol with primary hydroxyls and a hydroxyl number of 31.7 to 36.3

The reactants listed in Table III were mixed for all three runs in a manner similar to that described in Example I. After the mixture creamed, the foam rise completed, and the foam cured, the properties of the foam listed in Table III were determined with the results shown therein. It will be evident from the foregoing characterization of the foams produced that that produced in Run 2 was superior in flame retardant characteristics to that incorporating 2,3-dibromobutanediol (Run 3) and the conventional and toxic 4,4'-methylene bis (2-chloroaniline) of Run 1.

It will be evident that the terms and expressions which have been employed are used as terms of description and not of limitation. There is no intention in the use of such terms and expressions of excluding equivalents of the features shown and described or portions thereof and it is recognized that various modifications, by way of illustration, but not of limitation, variations in proportions, procedures and materials are possible within the scope of the invention claimed.

What is claimed is:

1. In the process of producing a cold cured, stable, fire retardant, high resilience polyether urethane foam having a sag factor of at least 2.2 by reaction of an unhalogenated polyether polyol and, as an organic isocyanate reactant, tolylene diisocyanate or polymethylene polyphenyl polyisocyanate of the formula:

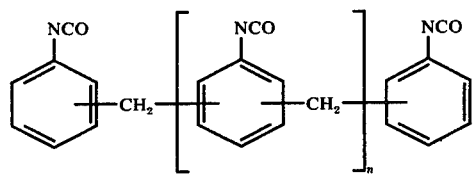

wherein $n$ is an integer predominantly of from 0 to 1 inclusive, or mixtures of said tolylene diisocyanate and said polymethylene polyphenyl polyisocyanate, in the presence of a blowing agent and catalyst; the improvement that comprises incorporating therein as a chain-extending agent and additional reactant, 2,3-dibromo-2-butenediol-1,4 in an amount by weight of said unhalogenated polyol of 3 to 9 percent; the resulting polyether urethane foam containing less than 5 percent of polymerized isocyanurate by weight of reactant isocyanate.

2. The process of claim 1 wherein said organic polyisocyanate component is a mixture of polymethylene polyphenyl polyisocyanate and tolylene diisocyanate.

3. The process of claim 2 wherein said polymethylene polyphenyl polyisocyanate is present within a ratio by weight of 1 to 2 parts thereof to each 1 part of said tolylene diisocyanate.

4. The process of claim 3 wherein said polymethylene polyphenyl polyisocyanate is present within a ratio by weight of 1.5 to 2 parts thereof to each 1 part of said tolylene diisocyanate.

5. The process of claim 3 wherein said polyisocyanate is undistilled.

6. The process of claim 3 wherein said polyisocyanate is a mixture comprising in excess of 50 percent by weight of trimer, in excess of 40 percent by weight of dimer and less than 5 percent of higher polymers.

7. The process of claim 3 wherein said tolylene diisocyanate is undistilled.

8. The process of claim 3 wherein said 2,3-dibromo-2-butenediol-1,4 is incorporated in the production of said foam in an amount sufficient to provide a bromine content in said foam of from at least about 1.5 percent by weight of said foam.

9. The process of claim 8 wherein the bromine content of said foam is within the range of about 1.5 percent to about 22 percent by weight.

10. The process of claim 9 wherein the bromine content provided is within the range of about 10 percent to about 18 percent by weight of said foam.

11. A cold cured, high resilience fire-retardant polyether urethane foam having a sag factor of at least 2.2 and a bromine content of at least 1.5 percent by weight prepared by reacting an unhalogenated polyol; as an organic isocyanate reactant, tolylene diisocyanate or a polymethylene polyphenyl polyisocyanate of the formula:

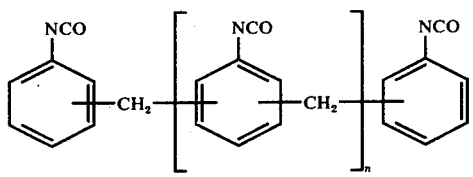

wherein $n$ is an integer predominantly of 0 to 1 inclusive; or mixtures of said tolylene diisocyanate and said polymethylene polyphenyl polyisocyanate; and as a chain-extending agent, 2,3-dibromo-2-butene-diol-1,4 in an amount by weight of said unhalogenated polyol of 3 to 9 percent, in the presence of a blowing agent and catalyst; the resulting polyether urethane foam containing less than 5 percent of polymerized isocyanurate by weight of isocyanate reactant.

12. A high resilience polyether urethane foam as claimed in claim 11 wherein said polyisocyanate is 4,4'-diphenylmethane diisocyanate.

13. A high resilience polyether urethane foam as claimed in claim 11 wherein said aromatic diisocyanate is an undistilled mixture of 2,4-tolylene diisocyanate and 2,6-tolylene diisocyanate.

14. A high resilience polyether urethane foam as claimed in claim 12 wherein said 4,4'-di-phenylmethane diisocyanate is undistilled.

15. A high resilience polyether urethane foam as claimed in claim 11 wherein said polyisocyanate is a mixture of undistilled 2,4-tolylene diisocyanate, 2,6-tolylene diisocyanate and undistilled 4,4'-diphenylmethane diisocyanate.

16. The high resilience polyether urethane foam as claimed in claim 11 hereof wherein said polyether polyol is a linear polyether triol.

17. A high resilience polyether urethane foam as claimed in claim 16 wherein said polyether is a poly (oxypropylene)triol having a molecular weight of at least 4000.

18. A high resilience fire-retardant polyether urethane foam as claimed in claim 11 wherein said isocyanate reactant is a mixture of polymethylene polyphenyl polyisocyanate and tolylene diisocyanate.

19. A high resilience fire-retardant polyether urethane foam as claimed in claim 18 wherein said polymethylene polyphenyl polyisocyanate is present within a ratio by weight of 1 to 2 parts thereof to each 1 part of said tolylene diisocyanate.

20. A high resilience fire-retardant polyether urethane foam as claimed in claim 19 wherein said polymethylene polyphenyl polyisocyanate is present within a ratio by weight of 1.5 to 2 parts thereof to each 1 part of said tolylene diisocyanate.

21. A high resilience polyether urethane foam as claimed in claim 19 having a sag factor of from about 2.4 to 3.1 wherein the bromine content of said foam is from about 1.5 percent to 10 percent by weight.

22. A high resilience fire-retardant polyether urethane foam as claimed in claim 19 wherein said polyisocyanate is an undistilled mixture.

23. A high resilience fire-retardant polyether urethane foam as claimed in claim 19 wherein said polyisocyanate mixture comprises in excess of 50 percent by weight of trimer, in excess of 40 percent by weight of dimer and less than 5 percent of higher polymers.

24. A high resilience fire-retardant polyether urethane foam as claimed in claim 19 wherein said tolylene diisocyanate is undistilled.

* * * * *